United States Patent [19]

Matlack et al.

[11] Patent Number: 5,320,472
[45] Date of Patent: Jun. 14, 1994

[54] NON-STOP LARGE BALE LOADING, TRANSPORTING AND UNLOADING MACHINE AND METHOD

[76] Inventors: Larry W. Matlack, R.R. 1, Box 185; William L. Matlack, R.R. 1, Box 186, both of Burrton, Kans. 67020

[21] Appl. No.: 65,820

[22] Filed: May 21, 1993

[51] Int. Cl.⁵ .................. A01D 90/00; B60P 1/50
[52] U.S. Cl. .................. 414/111; 414/24.5; 414/789.7; 414/486
[58] Field of Search ............... 414/24.5, 25, 911, 111, 414/789.7, 471, 486, 551, 721, 743, 501, 546; 56/474, 475, 476, 480

[56] References Cited

U.S. PATENT DOCUMENTS

| | | | |
|---|---|---|---|
| 4,249,842 | 2/1981 | Johnson | 414/24.5 |
| 4,268,199 | 5/1981 | Fontrier | 414/24.5 |
| 4,360,302 | 11/1982 | Askov et al. | 414/24.5 |
| 4,428,706 | 1/1984 | Butler et al. | 414/24.5 |
| 4,573,845 | 3/1986 | Carpenter | 414/24.5 |
| 4,578,008 | 3/1986 | Gleason | 414/24.5 |
| 4,930,964 | 6/1990 | Doan | 414/24.5 |
| 4,952,111 | 8/1990 | Callahan | 414/111 |
| 4,971,504 | 11/1990 | Klompien | 414/111 |
| 5,129,775 | 7/1992 | Coats et al. | 414/24.5 |
| 5,150,999 | 9/1992 | Dugan | 414/24.5 |
| 5,178,505 | 1/1993 | Smith | 414/24.5 |

FOREIGN PATENT DOCUMENTS 2198703 6/1988 United Kingdom ............. 414/111

OTHER PUBLICATIONS

Progressive Agricultural Designs Literature, "Big Square Bale Manager 8000", 4 pages.

*Primary Examiner*—Michael S. Huppert
*Assistant Examiner*—Stephen Gordon
*Attorney, Agent, or Firm*—John R. Flanagan

[57] ABSTRACT

A machine for loading, transporting and unloading large bales is capable of operating in a non-stop mode across a field and between the field and an unloading site. The non-stop machine includes a fore-and-aft extending mobile chassis movable over the field, an operator's station mounted at a front end of the mobile chassis, an elongated bale load bed, and a bracing structure supporting the bale load bed in an inclined relation above the mobile chassis with an upper front end of the bed overlying the operator's station at the front end of the mobile chassis and a lower rear end of the bed disposed adjacent to the field at the rear end of the mobile chassis. The non-stop machine also includes a front bale loader and a rear bale gate. The bale front loader is pivotally mounted to a front portion of the bracing structure forwardly of the operator's station and operable for transferring bales from a first orientation on the field, upwardly to a second orientation on the upper front end of the bed in which the bale is inverted relative to the first orientation, where the bales can then slide rearwardly down the bed toward the lower end thereof. The rear bale gate is pivotally mounted at the rear lower end of the bed and is movable between an upright stop position wherein the bales are retained on the load bed and a lower discharge position wherein the bales are permitted to slide from the load bed across the rear gate to the unloading site.

20 Claims, 5 Drawing Sheets

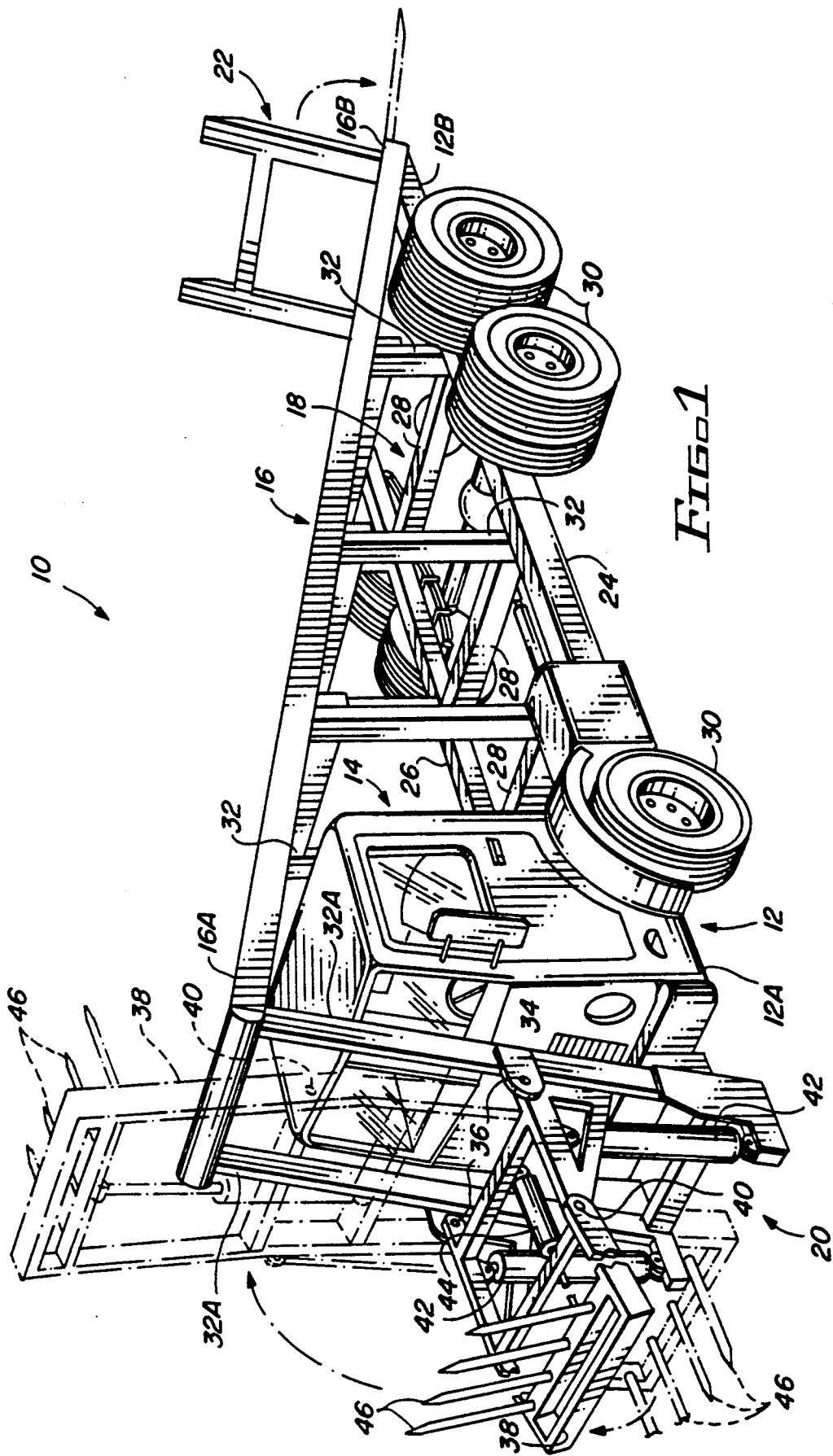

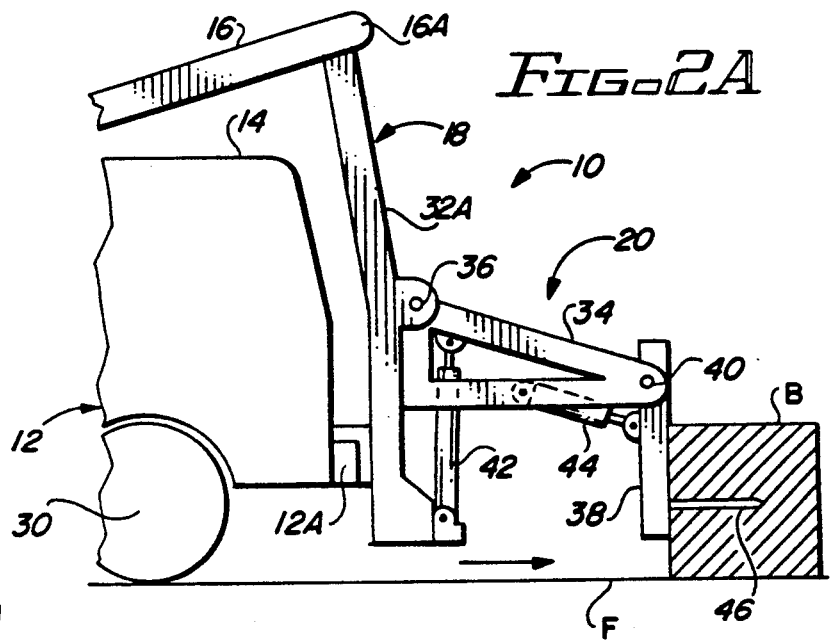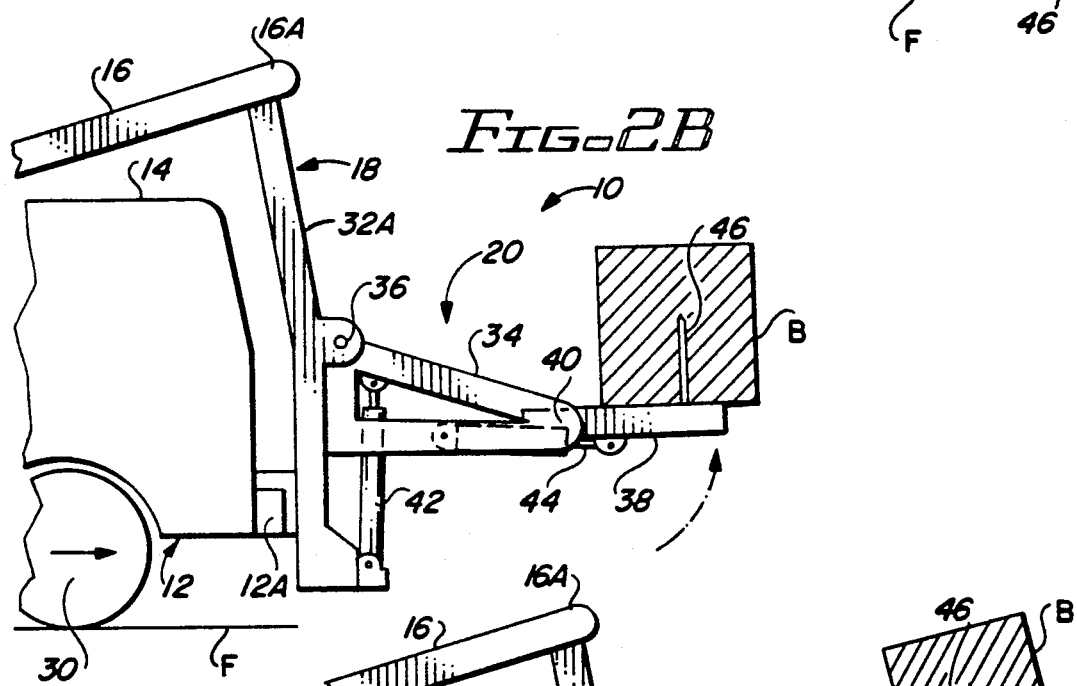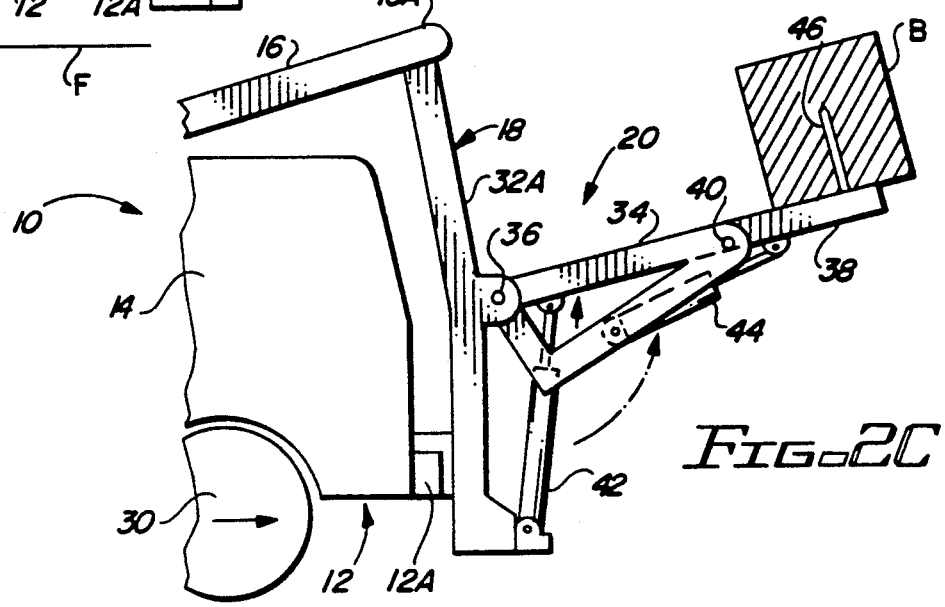

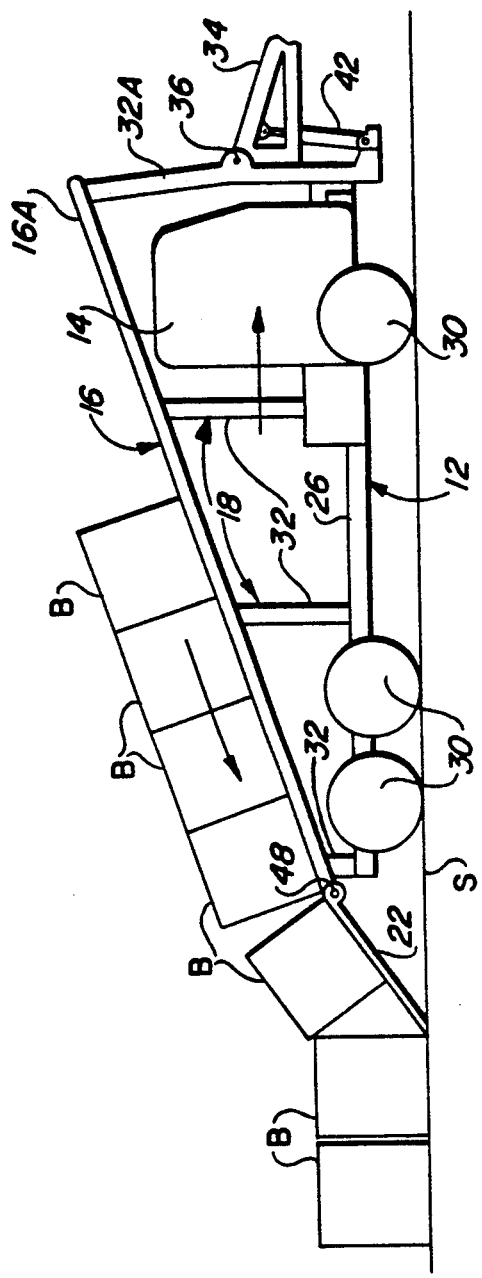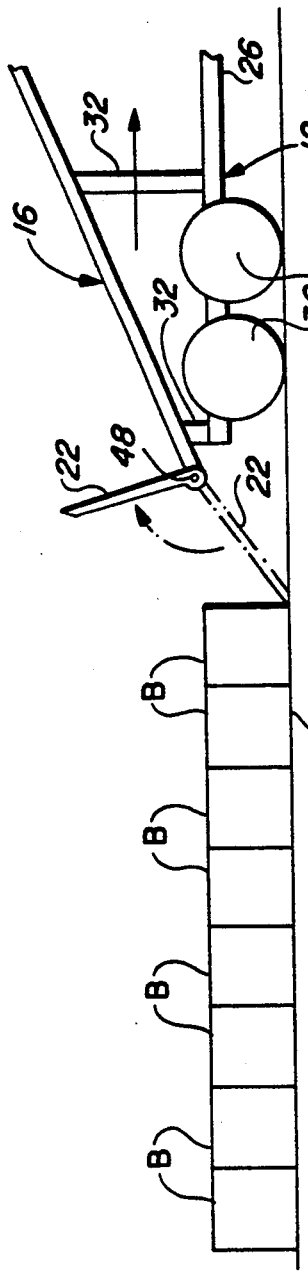

NON-STOP LARGE BALE LOADING, TRANSPORTING AND UNLOADING MACHINE AND METHOD

BACKGROUND OF THE INVENTION

1. Field of the Invention

The present invention generally relates to the handling of large bales and, more particularly, is concerned with a non-stop large bale loading, transporting and unloading machine and method.

2. Description of the Prior Art

In recent years, large rectangular bales of crop material, such as hay, have experienced growing and widespread use. In many parts of the country, large rectangular bales are replacing large round bales as the preferred hay package. However, like large round bales, large rectangular bales are far too large for manual handling and so require mechanical equipment to do so.

Various bale pickup and transport machines have been proposed in the prior patent art to accommodate large round and/or square bales. Representative examples of such machines are the ones disclosed in U.S. Pat. Nos. to Carpenter (4,573,845), Gleason (4,578,008), Doan (4,930,964) and Klompien (4,971,504). While these machines may operative satisfactorily under the limited range of conditions for which they were designed, they do not appear to approach an optimum solution to the problem of handling large bales in terms of cost and productivity of operation.

Thus, a large bale handling machine is highly desired which more nearly approaches an optimum solution to the large bale handling problem in terms of cost, efficiency, ease of operation and improved productivity. Such a machine would be one that can operate in a non-stop fashion in loading and transporting large bales from a field and in unloading the bales at a desired location.

SUMMARY OF THE INVENTION

The present invention provides a machine and method designed to satisfy the aforementioned needs and being operable for loading, transporting and unloading large rectangular or round bales in a non-stop mode of operation. The non-stop machine of the present invention will self-load and self-unload both large round and rectangular bales of hay with the use of hydraulic power and the assistance of gravity and inertia and without stopping.

Accordingly, the present invention is directed to a machine for loading and transporting large bales in a non-stop mode of operation across a field and from the field to an unloading site. The non-stop machine comprises: (a) a fore-and-aft extending mobile chassis movable over a field; (b) an elongated bale load bed; (c) means for supporting the bale load bed in an declining relation from front to rear above the mobile chassis with an upper front end of the load bed disposed above a front end of the mobile chassis and a lower rear end of the load bed disposed adjacent to the field at a rear end of the mobile chassis; and (d) a bale loader pivotally mounted to the bed supporting means forwardly of the front end of the mobile chassis and being operable to stick into a bale and transfer the bale from a first orientation on the field upwardly to the upper front end of the load bed in which the bale is in a second orientation inverted relative to the first orientation, where the bale can become unstuck from the bale loader and slide rearwardly down the load bed toward the lower end thereof.

More particularly, the load bed supporting means includes a bracing structure in the form of a plurality of upright brace members of decreasing height and disposed in a spaced relation from front to rear on the mobile chassis and supporting the load bed in the declining relation above the mobile chassis. The machine also has an operator's station mounted at the front end of the mobile chassis. A front one of the upright brace members supports the upper front end of declining load bed above and in an overlying relation to the operator's station at the front end of the mobile chassis.

The bale loader is pivotally mounted to the front one of the brace members and is located forwardly of the operator's station. The bale loader includes a first portion mounted to the front brace member for undergoing pivotal movement through a first angular displacement relative thereto, and a second portion mounted to the first portion for undergoing pivotal movement through a second angular displacement relative thereto such that the bale is rotated by the loader through approximately 200° as the loader is pivoted from a lower load position adjacent to the field to an upper discharge position adjacent to the upper front end of the load bed. Thus, the first and second angular displacements of the respective first and second loader portions together equal approximately 200° and separately equal approximately 100°. The bale loader further includes a plurality of elongated spikes mounted on the second portion of the bale loader. The spikes point in a forward direction when the second portion of the bale loader is at the lower load position and in a rearward direction when the second portion of the loader is at the upper discharge position.

The non-stop machine also includes means in the form of a bale gate pivotally mounted at the lower rear end of the load bed for moving between an upright stop position to retain bales on the load bed and a lower discharge position to permit bales to slide from the load bed onto the unloading site.

The present invention also is directed to a method for loading, transporting and unloading large bales in a non-stop mode of operation across a field and from the field to an unloading site. The non-stop method comprises the steps of: (a) moving across a field a mobile chassis having an operator's station mounted at a front end thereof; (b) as the mobile chassis is moving across the field, loading one bale at a time from a first orientation on the field upwardly in front of the operator's station and to a second orientation, in which the bale is inverted relative to the first orientation, onto an upper front end of an elongated flat load bed supported on the mobile chassis in a declining relation from front to rear above the mobile chassis with the upper front end of the load bed overlying the operator's station at a front end of the mobile chassis such that, as the mobile chassis is moving across the field, the loaded bale can slide rearwardly down the load bed toward a lower rear end thereof disposed adjacent to the field; (c) as the mobile chassis is moving across the field and toward an unloading site, retaining the loaded bales on the load bed; and (d) as the mobile chassis reaches and traverses the unloading site, discharging the bales from the lower rear end of the load bed onto the unloading site. Also, as the bale is loaded one bale at a time from the field upwardly onto the load bed, the bale is rotated through approximately 200°.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a machine for loading, transporting and unloading large bales in a non-stop mode of operation in accordance with the present invention.

FIGS. 2A-2F are a sequence of views showing the steps performed by a bale loader of the machine in loading a large bale from the field to a front receiving end of an elongated rearwardly declining load bed of the machine.

FIGS. 3A-3E are a sequence of diagrammatic views showing the overall steps performed by the machine in loading, transporting and unloading the bales in the non-stop mode of operation.

DETAILED DESCRIPTION OF THE INVENTION

Figure 3A:
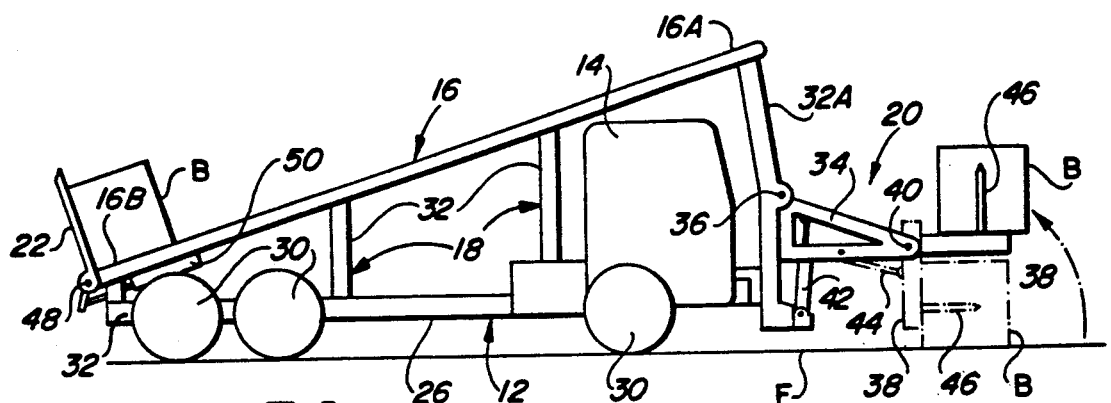
Figure 3B:
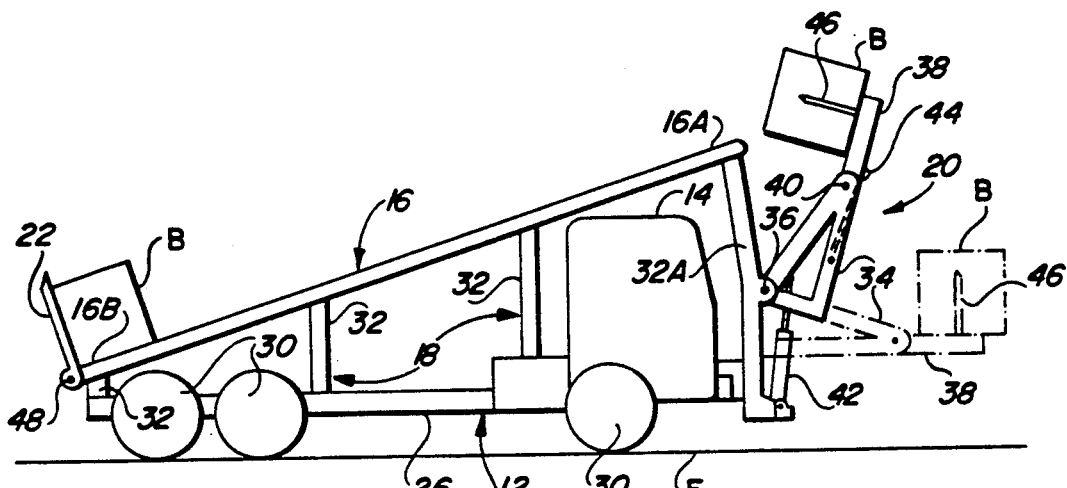
Figure 3C:
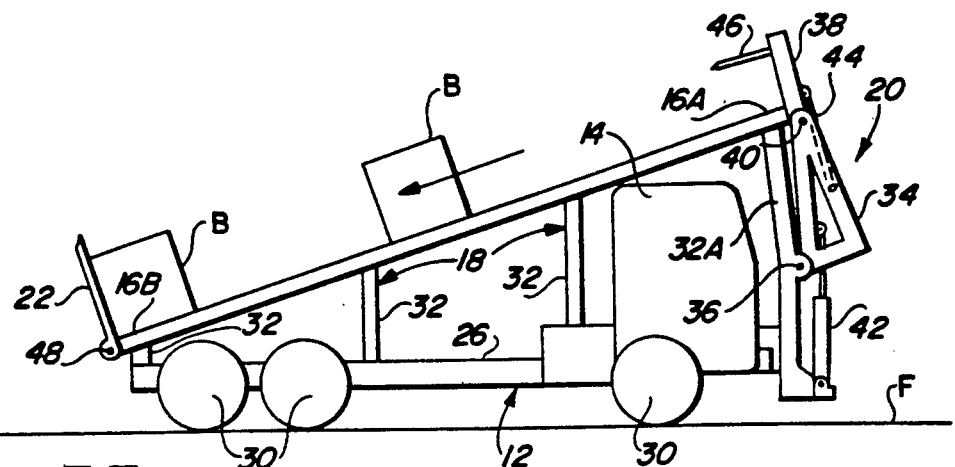

Referring to the drawings and particularly to FIG. 1, there is illustrated a non-stop bale handling machine of the present invention, generally designated 10, being capable of loading, transporting and unloading large bales B in a non-stop mode of operation across a field F (FIGS. 3A-3C) and from the field F to an unloading site S (FIGS. 3D and 3E). Basically, the non-stop bale handling machine 10 includes a fore-and-aft extending mobile chassis 12, an operator's cab or station 14 mounted at a front end 12A of the mobile chassis 12, an elongated flat load bed 16, and a bracing structure 18 supporting the load bed 16 in a declining relation from front to rear above the mobile chassis 12 such that an upper front end 16A of the load bed 16 overlies the operator's cab 14 at the front end 12A of the mobile chassis 12 and a lower rear end 16B of the load bed is disposed adjacent to the field F at the rear end 12B of the mobile chassis 12. The non-stop bale handling machine 10 also includes a front bale loader 20 and a rear bale gate 22.

The mobile chassis 12 of the machine 10 is formed of left and right longitudinal beams 24, 26 and spaced cross beams 28 extending between and rigidly connecting the longitudinal beams 24, 26. The cab 14 for housing the operator and the source of drive power, such as an engine (not shown) is supported on the front end 12A of the mobile chassis 12 by the longitudinal beams 24, 26. The mobile chassis 12 has sets of wheels 30 which support the chassis for movement across the field F.

The bracing structure 18 of the machine 10 includes a plurality of brace members 32 mounted in spaced relation and upright on the longitudinal beams 24, 26 of the mobile chassis 12. The upright brace members 32 are of decreasing height going from front to rear along the mobile chassis 12 so as to support the load bed 16 in the declining relation from front to rear above the mobile chassis 12 such that upper front end 16A of the load bed 16 overlies the operator's cab 14 at the front end 12A of the mobile chassis 12. A front one 32A of the brace members 32 is located in front the operator's cab 14 and mounted at the front ends of the longitudinal beams 24, 26 of the mobile chassis 12.

Referring to FIGS. 1 and 2A-2F, the front bale loader 20 of the machine 10 is pivotally mounted to the front brace member 32A forwardly of the operator's cab and is operable for transferring one bale B at a time from a first orientation on the field F upwardly to the upper front end 16A of the load bed 16 to a second orientation in which the base is inverted relative to the first orientation, where the bale B can then slide rearwardly down the declining load bed 16 toward the lower rear end 16B thereof. More particularly, the bale loader 20 includes a first or rear loader structure 34 mounted to the front upright brace member 32A for undergoing pivotal movement about pivots 36 through a first angular displacement relative to the front brace member 32A, and a second or front loader structure 38 mounted to the first or rear loader structure 34 for undergoing pivotal movement about pivots 40 through a second angular displacement relative to the first loader structure 34. Preferably, the first and second angular displacements together move through approximately 200° and separately each moves through approximately 100° such that together the first and second structures 34, 38 of the bale loader 20 are capable of rotating the bale B through approximately 200° as the bale loader 20 is pivoted from a lower load position (FIG. 2A) adjacent to the field F to an upper discharge position (FIG. 2F) adjacent to the upper front end 16A of the load bed 16.

The bale loader 20 also includes first and second actuators in the form of a first pair of hydraulic cylinders 42 and a second hydraulic cylinder 44 are provided for pivoting the first and second structures 34, 38 of the loader 20 in the desired manner. The first hydraulic cylinders 42 are respectively connected between the first loader structure 34 and the front upright brace member 32A while the second hydraulic cylinder 44 is between the second loader structure 38 and the first loader structure 34.

Figure 2D:
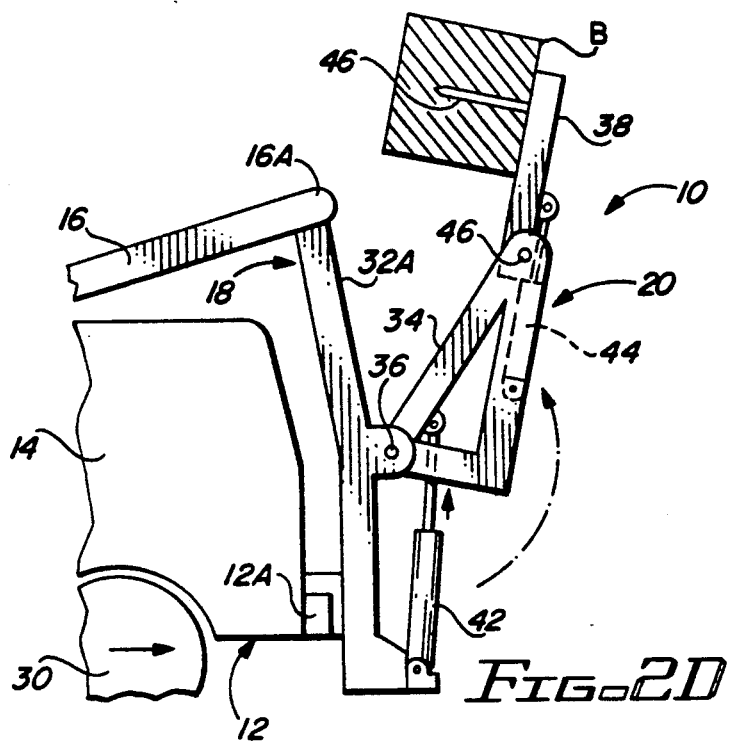
Figure 2F:
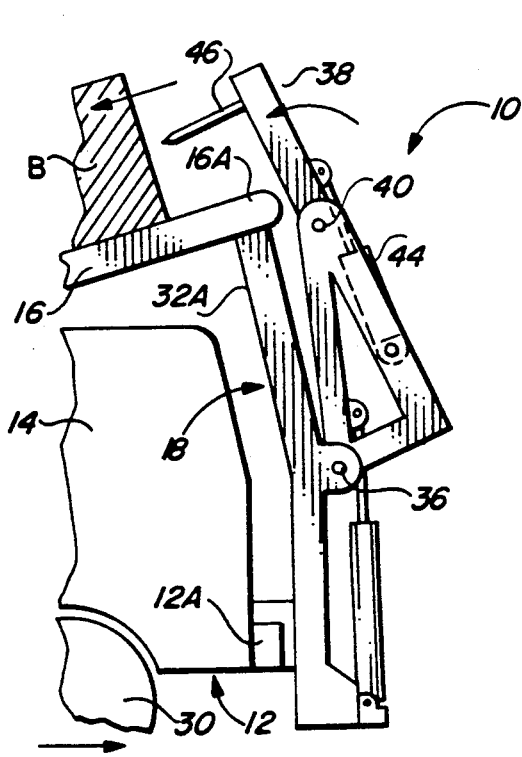
Figure 2E:
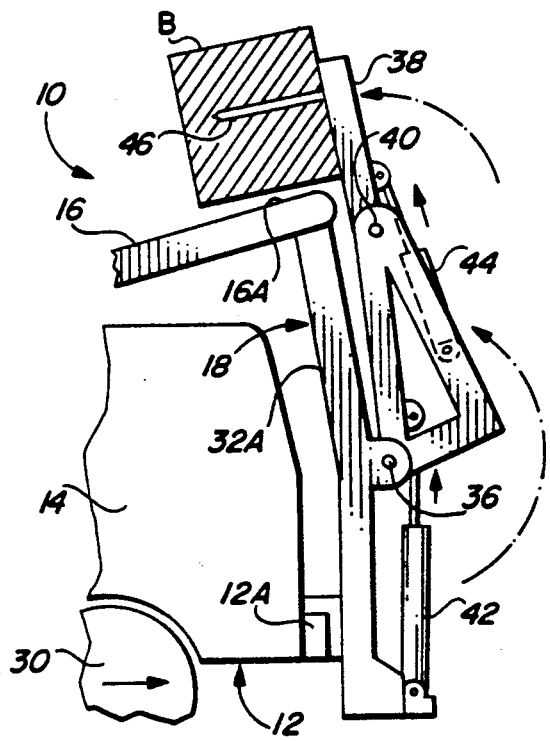

The bale loader 20 further includes a plurality of generally parallel extending elongated straight prongs or spikes 46 attached to the front or second loader structure 38. At the lower load position seen in FIG. 2A, the spikes 46 extending in generally horizontal relation to the field F. The spikes 46 are operable to stick into a bale B and to transfer the bale B from the field F upwardly to the upper front end 16A of the load bed 16 as the bale loader 20 is pivoted through its 180° path. At the upper front end 16A of the load bed 16 the bale B is moved rearwardly past the vertical which ensures that the bale B will become unstuck from the bale loader 20 when the bale loader stops it pivotal movement and slide rearwardly down the declining load bed 16 toward the lower rear end 16B thereof. It can be observed that the spikes 46 point in a substantially forward direction when the bale loader 20 is at the lower load position, as shown in FIG. 2A, and in a substantially rearward direction when the bale loader 20 is at the upper discharge position, as shown in FIG. 2E.

The rear bale gate 22 of the machine 10 is pivotally mounted by pivot 48 to the rear lower end 16B of the load bed 16 and is movable between an upright stop position, shown in solid line form in FIGS. 1, 3A-3C and 3E wherein the bales B are retained on the rearwardly declining load bed 16 and a lower discharge position, shown in dashed line form in FIGS. 1 and 3E and solid line form in FIG. 3D, wherein the bales B are permitted to slide from the rearwardly declining load bed 16 across the rear gate 22 to the unloading site S. As seen in FIG. 3A, an actuator in the form of a third hydraulic cylinder 50 is provided to pivotally move the rear gate 22 in the desired manner.

As seen in FIGS. 3A-3E, the non-stop bale handling machine 10 is adapted to pickup or load large rectangular or large round bales B and move them to the edge of the field or to a desired storage location S and unload them there. The machine 10 is adapted to do this without stopping and with the bales ranging in weight from 500 to 2500 pounds each. With the bale loader 20 in the lower load position, the spikes 46 are pointed forward and the mobile chassis 12 is driven across the field F to the bale B in a manner to cause the spikes 46 to stick in the bale B at approximately the horizontal center and approximately two feet down from the top of the bale. As the spikes 46 are driven into the bale, the operator engages suitable hydraulic controls which first pivot the front structure 38 of the loader 20 upwardly through about a 100° arc, as seen in FIGS. 2A-2B and FIG. 3A, and then pivot the rear structure 34 of the loader 20 upwardly through about a 100° arc to its uppermost position, as seen in FIGS. 2C-2E and 3B-3C. The bale B is now in an inverted orientation or upside down from its starting orientation on the ground and sitting at the top of the elongated declining load bed 16 on the top of the mobile chassis 12. The operator reverses the hydraulic controls to pivotal the loader 20 in reverse and withdraw the spikes 46 from the bale B and return them to their lower starting positions. As this is done the bale B slides rearwardly down the load bed 16. The sliding of the bale B is caused by gravity and/or inertia as the mobile chassis 12 moves forward. The bale stops its sliding movement when it reaches the rear bale gate 22. The next bale is loaded in the same manner and it slides to rest against the first bale and each successive bale loaded comes to rest on the previous bale until the load bed 16 is fully loaded.

After being fully loaded, the mobile chassis 12 is driven to the desired unloading site S. The operator slows down as the machine 10 reaches the unloading site S. The operator engages suitable hydraulic control to lower the rear bale gate 22, and then accelerates the mobile chassis 12 causing all of the bales to unload from the load bed 16 by the force of gravity and inertia, as seen in FIGS. 3D and 3E. The bales are left in a row close together sitting on the ground.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A machine for loading and transporting large bales and operating in a non-stop mode across a field, said machine comprising:
    (a) a fore-and-aft extending mobile chassis movable over a field;
    (b) an elongated bale bed;
    (c) means for supporting said bale load bed in a declining relation from front to rear above said mobile chassis with an upper front end of said bed disposed above a front end of said mobile chassis and a lower rear end of said bed disposed adjacent to the field at a rear end of said mobile chassis; and
    (d) a bale loader pivotally mounted to said load bed supporting means forwardly of said front end of said mobile chassis and having a first portion being operable to stick into a bale and upwardly transfer the bale from a first orientation on the field to a second orientation, said second orientation being on said upper front end of said load bed and in which the bale is inverted relative to said first orientation, and then unstick from the bale so as to allow the bale to slide rearwardly down said load bed toward said lower end thereof.

2. The machine of claim 1 wherein said load bed supporting means includes a plurality of upright brace members of decreasing height and mounted in a spaced relation from front to rear on said mobile chassis and supporting said load bed in said declining relation above said mobile chassis.

3. The machine of claim 1 wherein said bale loader further includes:
    a second upper portion mounted to a front portion of said load bed supporting means for undergoing pivotal movement through a first angular displacement relative thereto; and
    a third lower portion mounted to said upper portion for undergoing pivotal movement through a second angular displacement relative thereto such that the bale is rotated through approximately 200° as said bale loader is pivoted from a lower load position adjacent to the field to an upper discharge position adjacent to said upper front end of said load bed.

4. The machine of claim 3 wherein said first portion of said bale loader includes a plurality of elongated spikes mounted on said lower portion of said bale loader, said spikes pointing in a forward direction when said bale loader is at said lower load position and in a rearward direction when said bale loader is at said upper discharge position.

5. The machine of claim 3 wherein said first and second angular displacements are each approximately 100°.

6. The machine of claim 1 further comprising:
    an operator's station mounted at said front end of said mobile chassis.

7. The machine of claim 6 wherein said load bed supporting means is a bracing structure supporting said load bed in said declining relation above said mobile chassis with said upper front end of said bed overlying said operator's station at said front end of said mobile chassis.

8. The machine of claim 7 wherein said bracing structure includes a plurality of upright brace members of decreasing height and mounted in a spaced relation from front to rear on said mobile chassis and supporting said load bed in said declining relation above said mobile chassis.

9. The machine of claim 8 wherein said bale loader is pivotally mounted to a front one of said brace members being located forwardly of said operator's station.

10. The machine of claim 9 wherein said bale loader includes:
    an upper portion mounted to said front one of said brace members for undergoing pivotal movement through a first angular displacement relative thereto; and
    a lower portion mounted to said upper portion for undergoing pivotal movement through a second angular displacement relative thereto such that the bale is rotated through approximately 200° as said bale loader is pivoted from a lower load position adjacent to the field to an upper discharge position adjacent to said upper front end of said load bed.

11. The machine of claim 10 wherein said bale loader further includes a plurality of elongated spikes mounted on said lower portion of said bale loader, said spikes pointing in a forward direction when said bale loader is at said lower load position and in a rearward direction when said bale loader is at said upper discharge position.

12. A machine for loading, transporting and unloading large bales and operating in a non-stop mode across a field and from the field to an unloading site, said machine comprising:
   (a) a fore-and-aft extending mobile chassis movable over a field;
   (b) an operator's station mounted at a front end of said mobile chassis;
   (c) an elongated bale load bed;
   (d) means for supporting said bale load bed in a declining relation from front to rear above said mobile chassis with an upper front end of said load bed overlying said operator's station at said front end of said mobile chassis and a lower rear end of said load bed disposed adjacent to the field and unloading site at a rear end of said mobile chassis;
   (e) means mounted to said bed supporting means forwardly of said operator's station at said front end of said mobile chassis for engaging a bale and upwardly transferring the bale from a first orientation on the field to a second orientation, said second orientation being on said upper front end of said load bed and in which the bale is inverted relative to the first orientation, and disengaging from said bale so as to allow the bale to slide rearwardly down said load bed toward said lower end thereof; and
   (f) gate means movable between an upright stop position to remain bales on said load bed and a lower discharge position to permit bales to slide from said load bed onto the unloading site.

13. The machine of claim 12 wherein said gate means is a bale gate pivotally mounted at said rear lower end of said bed.

14. The machine of claim 12 wherein said load bed supporting means includes a plurality of upright brace members of decreasing height and mounted in a spaced relation on said mobile chassis and supporting said load bed in said declining relation above said mobile chassis.

15. The machine of claim 12 wherein said means mounted to said bed supporting means is a bale loader pivotally mounted to said bed supporting means forwardly of said operator's station at, said front end of said mobile chassis and having a first portion being operable to stick into a bale and transfer the bale from the field upwardly to said upper front end of said bed and unstick from the bale so as to permit the bale to slide rearwardly down said bed toward said lower end thereof.

16. The machine of claim 15 wherein said bale loader further includes,
   a second upper portion mounted to a front portion of said load bed supporting means for undergoing pivotal movement through a first angular displacement relative thereto; and
   a third lower portion mounted to said upper portion for undergoing pivotal movement through a second angular displacement relative thereto such that the bale is rotated through approximately 200° as said bale loader is pivoted from a lower load position adjacent to the field to an upper discharge position adjacent to said upper front end of said load bed.

17. The machine of claim 16 wherein said first portion of said bale loader includes a plurality of elongated spikes mounted on said lower portion of said bale loader, said spikes pointing in a forward direction when said bale loader is at said lower load position and in a rearward direction when said bale loader is at said upper discharge position.

18. The machine of claim 16 wherein said first and second angular displacements are each approximately 100°.

19. A non stop method of operation, for loading, transporting and unloading large bales across a field and from the field to an unloading site, said method comprising the steps of:
   (a) moving across a field a mobile chassis having an operator's station mounted at a front end thereof;
   (b) as the mobile chassis is moving, loading a plurality of bales, one bale at a time, upwardly from a first orientation on the field in front of the operator's station to a second orientation in which the bale is inverted relative to the first orientation and placed onto an upper front end of an elongated flat load bed supported on the mobile chassis in a declining relation from front to rear above the mobile chassis with the upper front end of the load bed overlying the operator's station at a front end of the mobile chassis such that, as the mobile chassis is moving across the field, each loaded bale can slide rearwardly down the load bed toward a lower rear end thereof disposed adjacent to the field;
   (c) as the mobile chassis is moving across the field and toward an unloading site, retaining the loaded bales on the load bed; and
   (d) as the mobile chassis reaches and traverses the unloading site, discharging the loaded bales from the lower rear end of the load bed onto the unloading site.

20. The method of claim 19 wherein as each bale is upwardly loaded one bale at a time from the field onto the load bed, the bale is rotated through approximately 200°.

* * * * *